(12) United States Patent
Macfarlane et al.

(10) Patent No.: US 6,178,341 B1
(45) Date of Patent: Jan. 23, 2001

(54) COLOR MEASUREMENT SYSTEM WITH COLOR INDEX FOR SKIN, TEETH, HAIR AND MATERIAL SUBSTANCES

(75) Inventors: Darby S. Macfarlane; David K. Macfarlane, both of Hastings-on-Hudson; Fred W. Billmeyer, Jr., Schenectady, all of NY (US); Hugh S. Fairman, Princeton, NJ (US)

(73) Assignee: Chromatics Color Sciences International, Inc., New York, NY (US)

( * ) Notice: Under 35 U.S.C. 154(b), the term of this patent shall be extended for 0 days.

(21) Appl. No.: 09/216,495

(22) Filed: Dec. 18, 1998

Related U.S. Application Data (60) Provisional application No. 60/068,013, filed on Dec. 18, 1997, and provisional application No. 60/068,237, filed on Dec. 19, 1997.

(51) Int. Cl.[7] .................................................. A61B 5/00
(52) U.S. Cl. ................................. 600/310; 356/406
(58) Field of Search ............................... 600/310, 315, 600/322, 476, 477; 356/402, 405, 406, 407, 408, 425; 395/131

(56) References Cited

U.S. PATENT DOCUMENTS

| | | | |
|---|---|---|---|
| 5,089,976 | * 2/1992 | Cate et al. | 356/402 |
| 5,313,267 | 5/1994 | MacFarlane et al. | 356/405 |
| 5,319,437 | 6/1994 | Van Aken et al. | 356/326 |
| 5,383,020 | * 1/1995 | Vieillefosse | 356/405 |

* cited by examiner

Primary Examiner—Eric F. Winakur
(74) Attorney, Agent, or Firm—Fish & Neave; Brajesh Mohan (57) ABSTRACT

Methods and systems for measuring with a Color Measurement System of predetermined specification and evaluating the color of skin, teeth, hair and material substances with a Color Index. The principles of this invention also relate to techniques for using such a Color Measurement System with the Color Index in medical applications such as the detection of chromogenic disease including bilirubin infant jaundice, cosmetics applications and in the evaluation of the color of hair or teeth, and other applications. The Color Index is measured and calculated from the reflectance spectrum of any skin (or teeth, hair or material substance) by a two step process. The first step is the weighting of the visible spectra with a unique set of weighting factors which calculate a sample's reflectance spectrum's contribution to the appearance of four color components independent of the illuminating condition. The second step places the sample's reflectance spectrum's contribution to the appearance of the four color components in opponency to each other and calculates the Color Index providing attributes representative of correlates of lightness-darkness (L, also referred to as lightness), redness-greenness (M) and yellowness-blueness (N).

38 Claims, 6 Drawing Sheets

COLOR MEASUREMENT SYSTEM WITH COLOR INDEX FOR SKIN, TEETH, HAIR AND MATERIAL SUBSTANCES

CROSS REFERENCE TO RELATED APPLICATIONS

This claims the benefit of copending, commonly-assigned U.S. Provisional Patent Application No. 60/068,013, filed Dec. 18, 1997 and copending, commonly-assigned U.S. Provisional Patent Application No. 60/068,237, filed Dec. 19, 1997.

BACKGROUND OF THE INVENTION

This invention relates to techniques for measuring with a Color Measurement System and evaluating the color of skin, teeth, hair and material substances with a Color Index. The invention also relates to techniques for using such a Color Measurement System with the Color Index in medical applications such as the detection of chromogenic disease including bilirubin infant jaundice, cosmetics applications and in the evaluation of the color of hair or teeth and other applications.

It is well known that color measuring instruments, such as spectrocolorimeters and spectrophotometers, can be used to measure the color of surfaces for a variety of useful applications. For example, Macfarlane et al. U.S. Pat. No. 5,313,267 describes a method and instrument for selecting personal compatible colors using a color measuring device. Also, PCT Publication No. WO 96/41140 describes methods and apparatus for determining the condition of a test subject based on color by using a color measuring instrument to detect change in a color factor indicative of a condition such as a disease, spoilage, ageing, etc. In particular, those methods and apparatus can be used to detect a medical condition known as hyperbilirubinemia by measuring skin color.

However, in order to accurately categorize skin versus each other (or teeth, hair or material substances, respectively), it is important that the Color Index used by the Color Measurement System for evaluating the color of skin, teeth, hair and material substances be independent of the illuminating condition and need not be calculated with respect to some standard illuminating condition. The alternative, allowing the Color Index to be dependent upon the conditions of illumination, would allow one sample (such as skin) to be categorized in one illuminating condition and another sample (such as skin) to be categorized in another illuminating condition, preventing any useful correlation of the colors of the two measurements.

It would be beneficial to develop a Color Measurement System for evaluating the color of skin, teeth, hair and material substances with a Color Index for skin, teeth, hair and material substances that makes a unique formulation of the opponent process of human vision. It is known that the contribution of redness and of greenness are in opponency to each other. Similarly, it is also known that the contribution of yellowness and of blueness are in opponency to each other. In other words, no color can exhibit qualities of redness and greenness at the same time, nor can a color exhibit qualities of yellowness and blueness at the same time. It would thus be beneficial to develop a Color Index for skin, teeth, hair and material substances that makes a unique formulation of the opponent process of human vision.

It would also be beneficial to develop a Color Measurement System for evaluating the color of skin, teeth, hair and material substances with a unique Color Index which is measured and calculated from the contribution of the reflectance spectrum of any skin (or teeth, hair, or material substance) to the appearance of four opponent colors, i.e., red-green and yellow-blue.

Furthermore, it would also be beneficial if the opponent process of human vision be formulated linearly with respect to the opponent contributions to color appearance rather than as an exponential function of the contributions as is conventionally held necessary for opponent-type systems.

In view of the foregoing, it is an object of this invention to provide a Color Measurement System for evaluating the color of skin, teeth, hair and material substances with a Color Index.

It is another object of this invention to provide a Color Measurement System for evaluating the color of skin, teeth, hair and material substances with a Color Index, wherein the Color Index is calculated from the contribution of the reflectance spectrum of any skin (or teeth, hair, or material substance) to the appearance of four opponent colors, i.e., red-green and yellow-blue.

It is yet another object of this invention to provide a Color Measurement System for evaluating the color of skin, teeth, hair and material substances with a Color Index that makes a unique formulation of the opponent process of human vision.

It is another object of this invention to provide a Color Measurement System for evaluating the color of skin, teeth, hair and material substances with a Color Index in which the opponent process is formulated linearly with respect to the opponent contributions to color appearance rather than as an exponential function of the contributions.

It is another object of this invention to provide a Color Measurement System for evaluating the color of skin, teeth, hair and material substances with a Color Index that is independent of the illuminating condition.

SUMMARY OF THE INVENTION

These and other objects of this invention are accomplished in accordance with the principles of the invention by providing a Color Measurement System for evaluating the color of skin, teeth, hair and material substances with a Color Index.

The Color Measurement System and Color Index for skin, teeth, hair and material substances of this invention is a unique Color Measurement System and Color Index measured and calculated from the reflectance spectrum of any skin (or teeth, hair or material substance). Uniquely, this invention's Color Measurement System and Color Index for Skin, Hair, and Material Substances is independent of the illuminating condition, as is necessary to accurately categorize skins versus each other (or teeth, hair or material substances respectively) in all illuminating conditions.

In accordance with the principles of this invention, the Color Index is measured and calculated from the reflectance spectrum of any skin (or teeth, hair or material substance) by a two step process. The first step is the weighting of the visible spectra with a unique set of weighting factors which calculate the contribution of the reflectance spectrum of any skin (or teeth, hair or material substance) to the appearance of four opponent colors, i.e., red-green and yellow-blue.

Conventionally, contributions to color appearance such as these were calculated with respect to some standard illuminating condition. Uniquely, the Color Measurement System and Color Index for skin, teeth, hair and material substances of this invention is independent of the illuminating condition.

The second step in measuring and calculating the Color Index in accordance with the principles of this invention places the contribution of the reflectance spectrum of any skin (or teeth, hair, or material substance) to the appearance of four opponent colors, i.e., redness-greenness and yellowness-blueness in opponency to each other. The Color Index in accordance with the principles of this invention is calculated from the contribution of the reflectance spectrum of any skin (or teeth, hair or material substance) to the appearance of four opponent color components and provides attributes representative of correlates of lightness-darkness (L, also referred to as lightness), redness-greenness (M) and yellowness-blueness (N).

According to one embodiment of this invention, evaluating color includes:

A method for evaluating color of a sample using a Color Measurement System with a Color Index, said method comprising:

measuring said sample's reflectance spectrum using a color measuring instrument;

weighting of said reflectance spectrum with weighting factors corresponding to four color components that form two opponent pairs of color components wherein said weighting factors are used to calculate said sample's reflectance spectrum's contribution to said four color components' appearance; and determining individual contributions corresponding to each of said four color components and calculating said Color Index using said individual contributions and respective contributions to each of a respective one of said four color components by a perfect diffuser, said determining comprising:

summing said sample's reflectance spectrum's contribution to the appearance of each of a respective one of said four color components at a plurality of wavelengths into said individual contributions corresponding to each of said four color components that form said two opponent pairs of color components.

A Color Measurement System for use with the above method is also provided. According to an illustrative embodiment of this invention:

A Color Measurement System for evaluating color of a sample with a Color Index comprising:

means for measuring said sample's reflectance spectrum;

means for weighting of said reflectance spectra with weighting factors corresponding to four color components that form two opponent pairs of color components wherein said weighting factors are used to calculate said sample's reflectance spectrum's contribution to said four color components' appearance;

means for determining individual contributions corresponding to each of said four color components and calculating said Color Index using said individual contributions and respective contributions to each of a respective one of said color components by a perfect diffuser, said determining comprising:

summing said sample's reflectance spectrum's contribution to the appearance of each of a respective one of said four color components at a plurality of wavelengths into said individual contributions corresponding to each of said four color components that form said two opponent pairs of color components.

According to another illustrative embodiment of this invention, evaluating color includes:

A method for evaluating color of a sample using a Color Measurement System with a Color Index, said method comprising:

adjusting a color measuring instrument's spectral response function to fit weighting factors corresponding to four color components that form two opponent pairs of color components wherein said weighting factors are used to calculate said sample's reflectance spectrum's contribution to said four color components' appearance;

measuring said sample's reflectance spectrum using said color measuring instrument wherein said sample's reflectance spectrum from said measuring is representative of a summing of said sample's reflectance spectrum's contribution to the appearance of each of a respective one of said four color components at a plurality of wavelengths into individual contributions corresponding to each of a respective one of said four color components that form two opponent pairs of color components; and calculating said Color Index using said individual contributions corresponding to each of a respective one of said four color components and respective contributions to each of a respective one of said four color components by a perfect diffuser.

A Color Measurement System for use with the above method is also provided. According to an illustrative embodiment of this invention:

A Color Measurement System for evaluating color of a sample with a Color Index comprising:

a color measuring instrument having an associated spectral response function for measuring said sample's reflectance spectrum, said spectral response function adjusted to fit weighting factors corresponding to four color components that form two opponent pairs of color components wherein said weighting factors are used to calculate said sample's reflectance spectrum's contribution to said four color components' appearance, said sample's reflectance spectrum from said measuring is representative of individual contributions corresponding to each of said four color components that form said two opponent pairs of color components; and means for calculating said Color Index using said individual contributions corresponding to each of said four color components that form said two opponent pairs of color components and respective contributions to each of a respective one of said four color components by a perfect diffuser.

DETAILED DESCRIPTION OF THE PREFERRED EMBODIMENTS

The Color Measurement System and Color Index for Skin, Teeth, Hair and Material Substances in accordance with the principles of this invention utilizes four opponent contributions to color appearance, i.e., redness-greenness and yellowness-blueness, unlike other formulations of color that utilize only three attributes (redness, greenness, and blueness).

Produced hereunder in Table 1 is a tabular representation of weighting factors for calculating the contribution to the appearance of redness, yellowness, greenness and blueness by the reflectance spectrum of a sample (skin, teeth, hair and material substances) for which color is being evaluated with a Color Index in accordance with an illustrative embodiment of this invention.

TABLE 1

| λ (nm) | Rwt | Ywt | Gwt | Bwt |
|---|---|---|---|---|
| 400 | 0 | 0 | 0 | 7 |
| 410 | 0 | 0 | 0 | 77 |
| 420 | 8 | −11 | −12 | 310 |
| 430 | 15 | −33 | −12 | 669 |
| 440 | 15 | −33 | −24 | 979 |
| 450 | 8 | −22 | −24 | 1000 |
| 460 | 0 | −22 | 0 | 937 |
| 470 | −15 | −22 | 59 | 782 |
| 480 | −38 | −33 | 153 | 535 |
| 490 | −62 | −22 | 271 | 303 |
| 500 | −100 | −11 | 459 | 218 |
| 510 | −146 | 22 | 753 | 141 |
| 520 | −169 | 174 | 1000 | 70 |
| 530 | −131 | 435 | 965 | 7 |
| 540 | −38 | 870 | 600 | −35 |
| 550 | 100 | 1000 | 376 | −49 |
| 560 | 285 | 967 | 247 | −49 |
| 570 | 500 | 815 | 118 | −35 |
| 580 | 708 | 554 | 24 | −14 |
| 590 | 908 | 228 | 0 | 7 |
| 600 | 1000 | −33 | −35 | 21 |
| 610 | 985 | −185 | −71 | 28 |
| 620 | 862 | −228 | −94 | 28 |
| 630 | 685 | −207 | −94 | 28 |
| 640 | 469 | −152 | −82 | 21 |
| 650 | 300 | −98 | −59 | 14 |
| 660 | 177 | −54 | −47 | 7 |
| 670 | 92 | −22 | −35 | 7 |
| 680 | 46 | −11 | −12 | 0 |
| 690 | 23 | 0 | −12 | 0 |
| 700 | 15 | −11 | 0 | 0 |
| SUM | Rn | Yn | Gn | Bn |
|  | 6502 | 3855 | 4412 | 6014 |

The weighting factors depicted above in Table 1 are a unique set of weighting factors which are used to calculate a sample's reflectance spectrum's contributions to the appearance of redness, yellowness, greenness and blueness.

Column headings Rwt, Ywt, Gwt and Bwt refer to weighting factors corresponding to red, yellow, green and blue contributions to color appearance, respectively, in accordance with the principles of this invention. The index to the rows of the information presented in Table 1 corresponds to λ (wavelength) measured in nanometers(nm) at increments of 10 nm. It will, however, be understood that if the spectrum is measured at intervals other than 10 nm, the needed data can be easily ascertained using cubic Lagrange interpolation. With regard to data for the first and last intervals, quadratic Lagrange interpolation may be utilized. Furthermore, values of the functions outside the tabulated range presented in Table 1 may be taken to be zero.

The values at the bottom of the columns corresponding to red, yellow, green and blue contributions to color appearance (indexed as SUM) correlates to contributions to each color attribute on the part of a perfect diffuser, i.e., a theoretical object having 100% reflectance. The SUM values corresponding to red, yellow, green and blue contributions to color appearance are identified as Rn, Yn, Gn and Bn, respectively, and correspond to numerical sums of values in corresponding columns.

Figure 1:
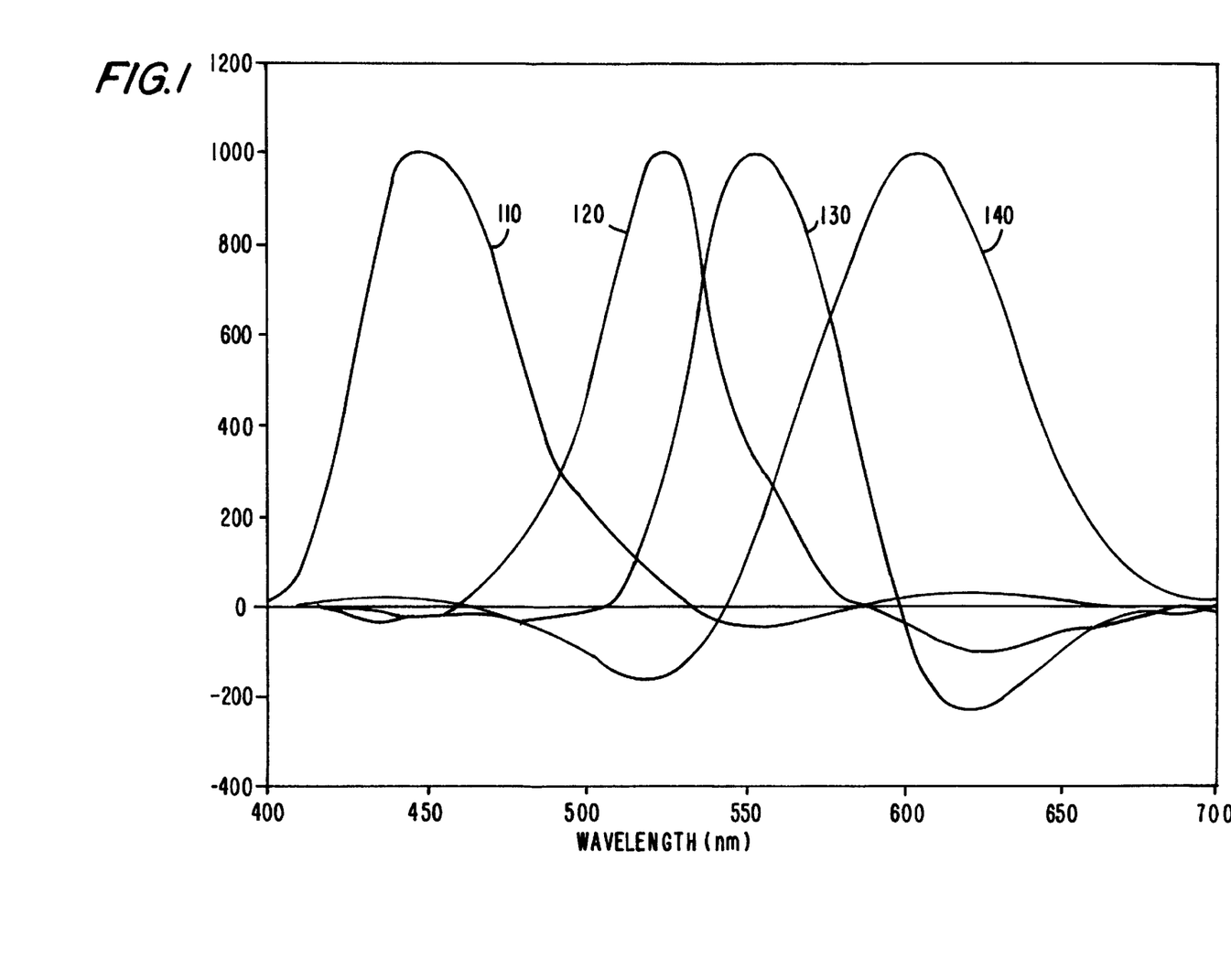
FIG. 1 is a graphical representation of the weighting factors for calculating the contribution to the appearance of redness, yellowness, greenness and blueness by the reflectance spectrum of a sample (skin, teeth, hair and material substances) for which color is being evaluated with a Color Index in accordance with an illustrative embodiment of this invention.

FIG. 1 is a graphical representation of the tabulated information presented in Table 1 in accordance with this invention. The y-axis in FIG. 1 represents the weighting factors while the x-axis represents wavelength (measured in nanometers). Curve 110 is a graphical representation of the weighting factors corresponding to the color blue within the visible spectra (400 nm–700 nm). These factors are presented in tabular form in Table 1 under column heading Bwt which, as mentioned earlier, corresponds to the contribution by the color blue to the appearance of any reflectance spectrum in accordance with the principles of this invention.

Similarly, curves 120, 130 and 140 are graphical representations of weighting factors corresponding to the colors green, yellow and red, respectively, within the visible spectra (400 nm–700 nm), also presented in tabular form in Table 1 under corresponding column headings Gwt, Ywt and Rwt. These weighted values correspond to the contributions to color appearance by respective colors green, yellow and red to the appearance of any reflectance spectra in accordance with the principles of this invention.

From the standpoint of color, the effect of an object on light can be described by its spectral transmittance or reflectance curve (for transparent or opaque materials, respectively; both are needed for translucent objects). These curves show the fraction of the light reflected at each wavelength from the material (compared to that reflected from a suitable white reflecting standard) or transmitted through it (compared to that transmitted by a suitable standard, often air).

In order to illustrate the features of this invention, the reflectance spectra of twenty-four skin samples are used. The twenty-four skin samples are chosen so that the specimens visually represent evenly-stepped scales of color through the central portion of the Caucasian skin range. As can be seen from the reflectance spectra of the skin samples represented in FIGS. 2 and 3, the series of colors are quite close to each other and most specimens represent differences from their nearest neighbor of only about 2–3 times the least perceptible color difference.

Figure 2:
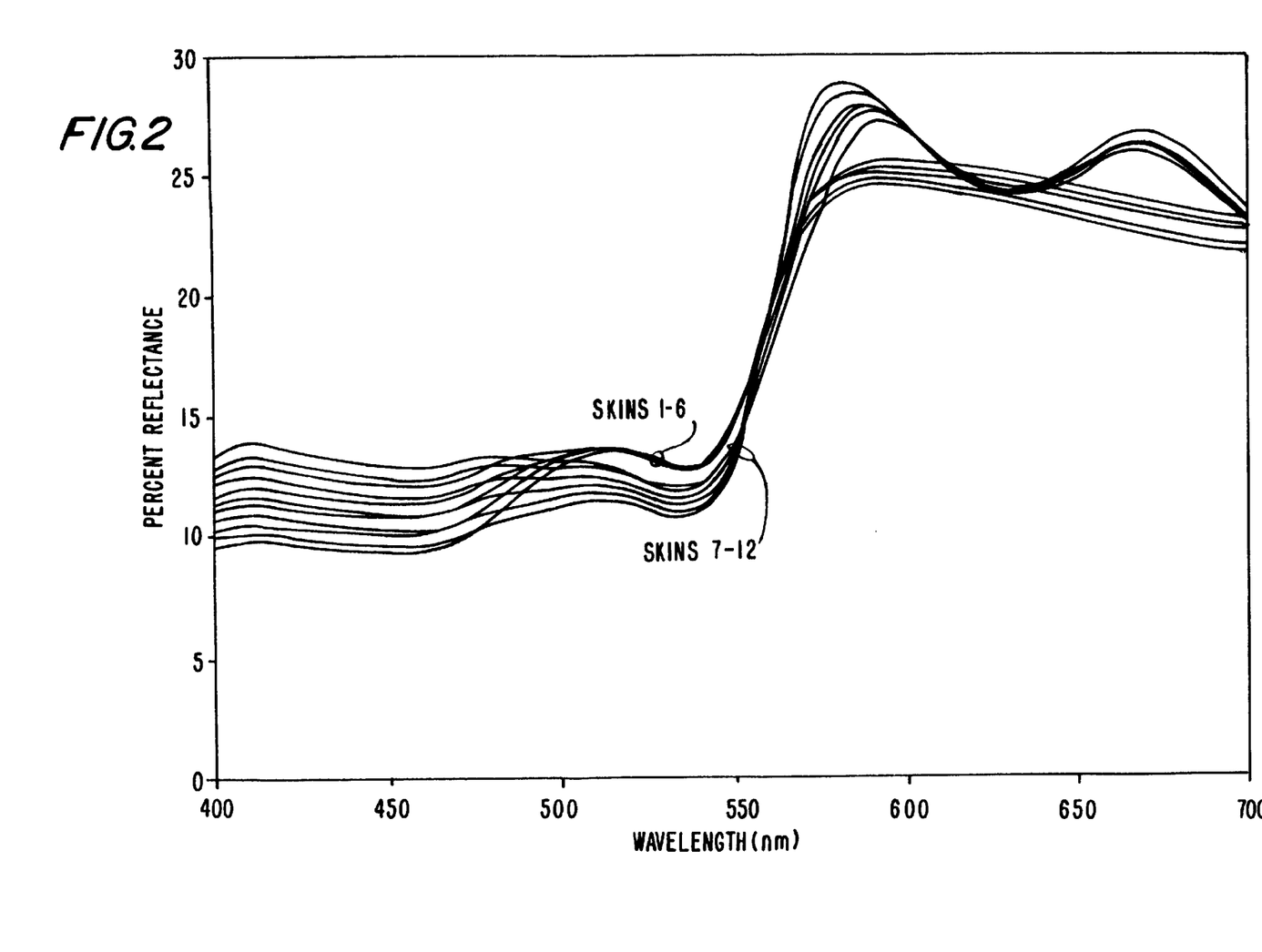
FIG. 2 is a graphical representation of the reflectance spectra of a darker series of twelve skin samples.

FIG. 2 is a graphical representation of the reflectance spectra of a darker series of twelve skin samples (1–12). As shown in FIG. 2, the percent reflectance is represented along the y-axis while the wavelength (measured in nanometers) is represented along the x-axis. The reflectance spectra of a darker series of skin samples shown in FIG. 2 may be determined using a color measuring instrument such as a spectrocolorimeter or a spectrophotometer or other color measuring instrument suitable for measuring the color of a sample surface such as skin, teeth, hair or material substances. The Color Measurement System for evaluating the color of skin, teeth, hair and material substances in accordance with an illustrative embodiment of this invention comprises such a color measuring instrument.

Figure 3:
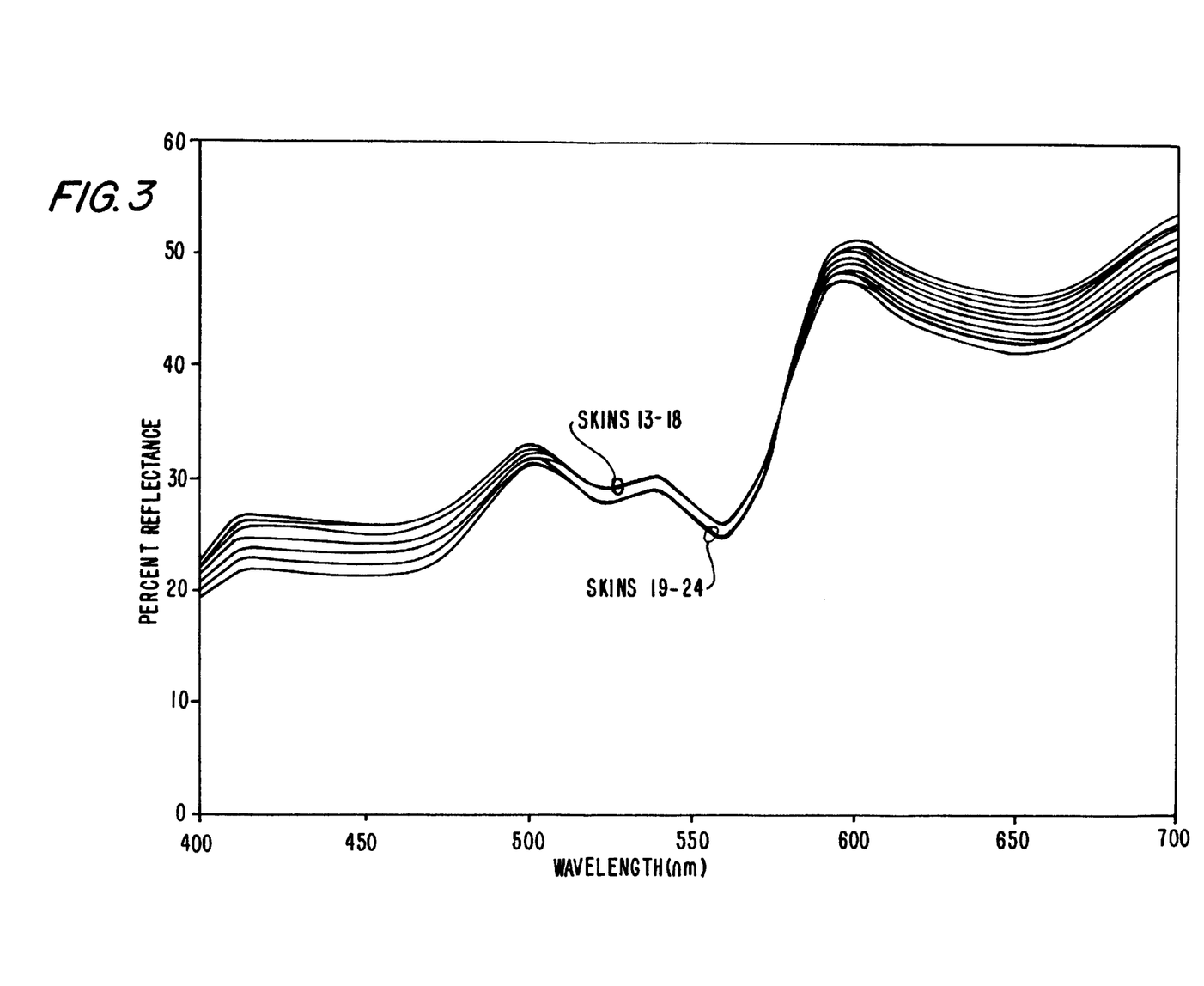
FIG. 3 is a graphical representation of the reflectance spectra of a lighter series of twelve skin samples.

FIG. 3 is a graphical representation, similar to the one illustrated in FIG. 2, of the reflectance spectra of a lighter series of twelve skin samples (13–24). Similar to the graphical representation of FIG. 2, in FIG. 3 the percent reflectance is represented along the y-axis while the wavelength is represented along the x-axis. The reflectance spectra shown in FIG. 3 may also be determined using a color measuring instrument such as a spectrocolorimeter or a spectrophotometer or other color measuring instrument suitable for measuring the color of a sample surface such as skin, teeth, hair or material substances. The color measurement system for evaluating the color of skin, teeth, hair and material substances in accordance with an illustrative embodiment of this invention comprises such a color measuring instrument.

The Color Measurement System and Color Index for skin, teeth, hair and material substances in accordance with the principles of this invention is a unique Color Measurement System and Color Index measured and calculated from the reflectance spectrum of any skin (or teeth, hair or material substance) by a two step process.

The first step is the weighting of the visible spectra (400 nm–700 nm) with a unique set of weighting factors which calculate the sample's reflectance spectrum's contribution to the appearance of redness, yellowness, greenness and blueness. These unique set of weighting factors, as mentioned earlier, are presented in tabulated form in Table 1. Also, a graphical representation of the tabulated values of the weighting factors presented in Table 1 is presented in FIG. 1.

The second step in measuring and calculating the Color Index in accordance with the principles of this invention places the contribution of the reflectance spectrum of any skin (or teeth, hair, or material substance) to the appearance of four opponent colors, i.e., redness-greenness and yellowness-blueness, in opponency to each other. The Color Index in accordance with the principles of this invention is calculated from the contribution of the reflectance spectrum of any skin (or teeth, hair, or material substance) to the appearance of four opponent color components and provides attributes representative of correlates of lightness-darkness (L, also referred to as lightness), redness-greenness (M) and yellowness-blueness (N).

It is known that the contribution of redness and of greenness are in opponency to each other and that the contribution of yellowness and blueness are also in opponency to each other. That is, no color can exhibit qualities of redness and greenness at the same time, nor can a color exhibit qualities of yellowness and blueness at the same time.

By utilizing four opponent contributions to color appearance, the Color Measurement System and Color Index for Skin, Teeth, Hair and Material Substances of this invention makes a unique formulation of the opponent process of human vision. Furthermore, the Color Measurement System and Color Index for Skin, Teeth, Hair and Material Substances of this invention is further unique in that its opponent process is formulated linearly with respect to the opponent contributions to color appearance rather than as an exponential function of the contributions as is conventionally held necessary.

In order to evaluate the color of skin, teeth, hair and material substances in accordance with the principles of this invention, the reflectance spectrum of any skin (or teeth, hair or material substance) is measured. To illustrate the principles of this invention the reflectance spectrum of twenty-four skin samples are utilized (as graphically illustrated in FIGS. 2 and 3).

As described earlier, the reflectance spectrum of a sample may be determined using a color measuring instrument such as a spectrocolorimeter or a spectrophotometer or other color measuring instrument suitable for measuring the color of a sample surface such as skin, teeth, hair or material substances. In an illustrative embodiment of this invention, the Color Measurement System and Color Index for Skin, Teeth, Hair and Material Substances of this invention comprises such a color measuring instrument.

In accordance with an illustrative embodiment of this invention, after the reflectance spectra of a sample for which color is being evaluated is measured, the sample's reflectance spectrum's contribution to the appearance of four color components is calculated by weighting the reflectance spectrum of any color (using the weighting factors of Table 1 and FIG. 1) and summing the contributions to color appearance at all wavelengths into individual components corresponding to each of the four opponent colors in accordance with the equations produced hereunder, collectively referred to as equation 1a:

$$R = \Sigma R(\lambda) * Rwt(\lambda) \Delta\lambda$$

$$Y = \Sigma R(\lambda) * Ywt(\lambda) \Delta\lambda$$

$$G = \Sigma R(\lambda) * Gwt(\lambda) \Delta\lambda$$

$$B = \Sigma R(\lambda) * Bwt(\lambda) \Delta\lambda \quad (1a)$$

In the above equations, R is representative of the reflectance factor of the sample for which color is being evaluated and is expressed as a decimal fraction, $Rwt(\lambda)$, $Ywt(\lambda)$, $Gwt(\lambda)$ and $Bwt(\lambda)$ are weighting factors (shown in Table 1 and FIG. 1) used in calculating the contribution of the sample's reflectance spectrum to the appearance of each of the four opponent color contributions in accordance with the principles of this invention. The data for these weighting factors is provided in tabulated form in Table 1 at wavelength intervals of 10 nm and is graphically depicted in FIG. 1. Also, for the equations collectively referred to as equation 1a, the value of $\lambda$ varies from 1 to k measurement intervals, where k is the number of points at which the reflectance spectrum is measured.

As mentioned earlier, even though the weighting factors provided in Table 1 are at intervals of 10 nm, the weighting factors may be assumed to be continuous. Accordingly, if the spectrum is measured at intervals other than 10 nm intervals, cubic Lagrange interpolation of missing but needed data in other than the first and last missing interval is applicable. Similarly, quadratic Lagrange interpolation in the first and last missing interval may be used to determine needed data. Also, the values of the functions outside the tabulated range may be taken to be zero.

The equations collectively referred to as equation 1a may also be represented in matrix notation as:

$$T = AR \quad (1b)$$

where T is representative of a 4×1 vector of opponent components, A is representative of a 4×k matrix of weighting factors (Table 1 transposed), R is representative of a k×1 vector of reflectance factors for the sample for which color is being evaluated and k is the number of points at which the reflectance spectrum is measured in the visible wavelengths.

The Color Index for skin (or teeth, hair or material substance) in accordance with the principles of this invention is calculated from the skin's (or teeth, hair or material substance) spectrum's contribution to the appearance of four color components by the following equations, collectively referred to as equation 2:

$$L=2.55\{33.333(R/Rn)+17.333(Y/Yn)+16.0(G/Gn)+33.333(B/Bn)+0.39\}^{1/3}-1.863$$

$$M=\{88(R/Rn)-46(Y/Yn)-42(G/Gn)\}/L$$

$$N=\{75(R/Rn)+40(Y/Yn)+35(G/Gn)-150(B/Bn)\}/L \quad (2)$$

In the above equations, L is representative of a correlate of lightness-darkness (also referred to as lightness), M is representative of a correlate of redness-greenness and N is representative of a correlate of yellowness-blueness. R, Y, G and B refer to the summed contribution from equation 1 of the spectrum being analyzed for each color component.

The values corresponding to Rn, Yn, Gn and Bn are presented at the bottom of the columns corresponding to red, yellow, green and blue contributions to color appearance (indexed as SUM) in Table 1 and correspond to contributions to each color attribute on the part of a perfect diffuser, i.e., a theoretical object having 100% reflectance. As described earlier, the values of L, M and N are continuous and may be calculated to any precision warranted by the precision of the spectral data.

It may be desirable in some color evaluating applications, for example, to calculate a six digit, single number index $CSCI_6$ (Color Measurement System and Color Index; six-digit) using the Color Measurement System and Color Index of this invention, even though such an index would be discrete rather than continuous. Where such a single number index is desired, it may be calculated using the following equation:

$$CSCI_6=10000*INT(10*(L+0.05))+100*INT(10*(M+0.05))+INT(10*(N+0.05)) \quad (3)$$

In the above equation, the symbol INT stands for the integer value of the corresponding expression within parentheses. In the resulting six digit single number index ($CSCI_6$), the first two digits are a correlate of lightness-darkness (L, also referred to as lightness), the second two digits are a correlate of redness-greenness (M) and the last two digits are a correlate of yellowness-blueness (N).

As described earlier, in order to illustrate the features of this invention, the reflectance spectra of twenty-four skin samples are chosen so that the specimens visually represent evenly-stepped scales of color through the central portion of the Caucasian skin range. Also, as can be seen from the reflectance spectra of the skin samples represented in FIGS. 2 and 3, the series of colors are quite close to each other and most specimens represent differences from their nearest neighbor of only about 2–3 times the least perceptible color difference. Using the Color Index calculated in accordance with the principles of this invention, the attributes corresponding to redness (M) and yellowness (N) can be presented in even numerical intervals similar to the visual evaluation of the specimen which is located in colorimetrically evenly-stepped intervals.

Table 2 produced hereunder shows in tabular form the results of calculations performed in accordance with the above described feature of this invention using eq. 3 to evaluate the color of the specimens having a reflectance spectrum graphically illustrated in FIGS. 2 and 3.

TABLE 2

|  | Skin #1 | Skin #2 | Skin #3 | Skin #4 | Skin #5 | Skin #6 |
|---|---|---|---|---|---|---|
| L | 4.40 | 4.38 | 4.36 | 4.35 | 4.33 | 4.30 |
| M | 2.02 | 2.08 | 2.15 | 2.21 | 2.26 | 2.33 |
| N | 0.97 | 1.21 | 1.45 | 1.67 | 1.91 | 2.15 |
| $CSCI_6$ | 442010 | 442112 | 442115 | 442217 | 432319 | 432322 |
|  | Skin #7 | Skin #8 | Skin #9 | Skin #10 | Skin #11 | Skin #12 |
| L | 4.43 | 4.43 | 4.41 | 4.37 | 4.36 | 4.34 |
| M | 2.44 | 2.47 | 2.51 | 2.55 | 2.58 | 2.62 |
| N | 1.05 | 1.29 | 1.53 | 1.76 | 2.03 | 2.27 |
| $CSCI_6$ | 442411 | 442513 | 442515 | 442518 | 442620 | 432623 |
|  | Skin #13 | Skin #14 | Skin #15 | Skin #16 | Skin #17 | Skin #18 |
| L | 5.83 | 5.81 | 5.79 | 5.78 | 5.76 | 5.75 |
| M | 2.53 | 2.59 | 2.63 | 2.67 | 2.76 | 2.82 |
| N | 0.46 | 0.65 | 0.89 | 1.11 | 1.35 | 1.61 |
| $CSCI_6$ | 582505 | 582606 | 582609 | 582711 | 582813 | 572816 |
|  | Skin #19 | Skin #20 | Skin #21 | Skin #22 | Skin #23 | Skin #24 |
| L | 5.85 | 5.84 | 5.82 | 5.80 | 5.77 | 5.76 |
| M | 2.97 | 3.00 | 3.08 | 3.15 | 3.17 | 3.24 |
| N | 0.52 | 0.72 | 0.99 | 1.22 | 1.41 | 1.67 |
| $CSCI_6$ | 583005 | 583007 | 583110 | 583112 | 583214 | 583217 |

Shown in tabular form in Table 2 are the lightness (L), redness (R) and yellowness (N) values corresponding to each of a respective of twenty-four skin samples with varying degrees of lightness as illustrated in FIGS. 2 and 3. These values are determined using equations 1 and 2 and the data presented in Table 1, and FIGS. 1, 2 and 3.

Also shown in Table 2 are the $CSCI_6$ values corresponding to each of the twenty-four skin samples of FIGS. 2 and 3 determined using equation 3. As mentioned earlier, in the six-digit single number index ($CSCI_6$) the first two digits are a correlate of lightness (L), the second two digits a correlate of redness (M) and the last two digits a correlate of yellowness (N). It can be seen from the information presented in Table 2 that the lightness attributes L of these spectra according to the developed index are similar to each other within each series of dark and light skin specimen.

Figure 4:
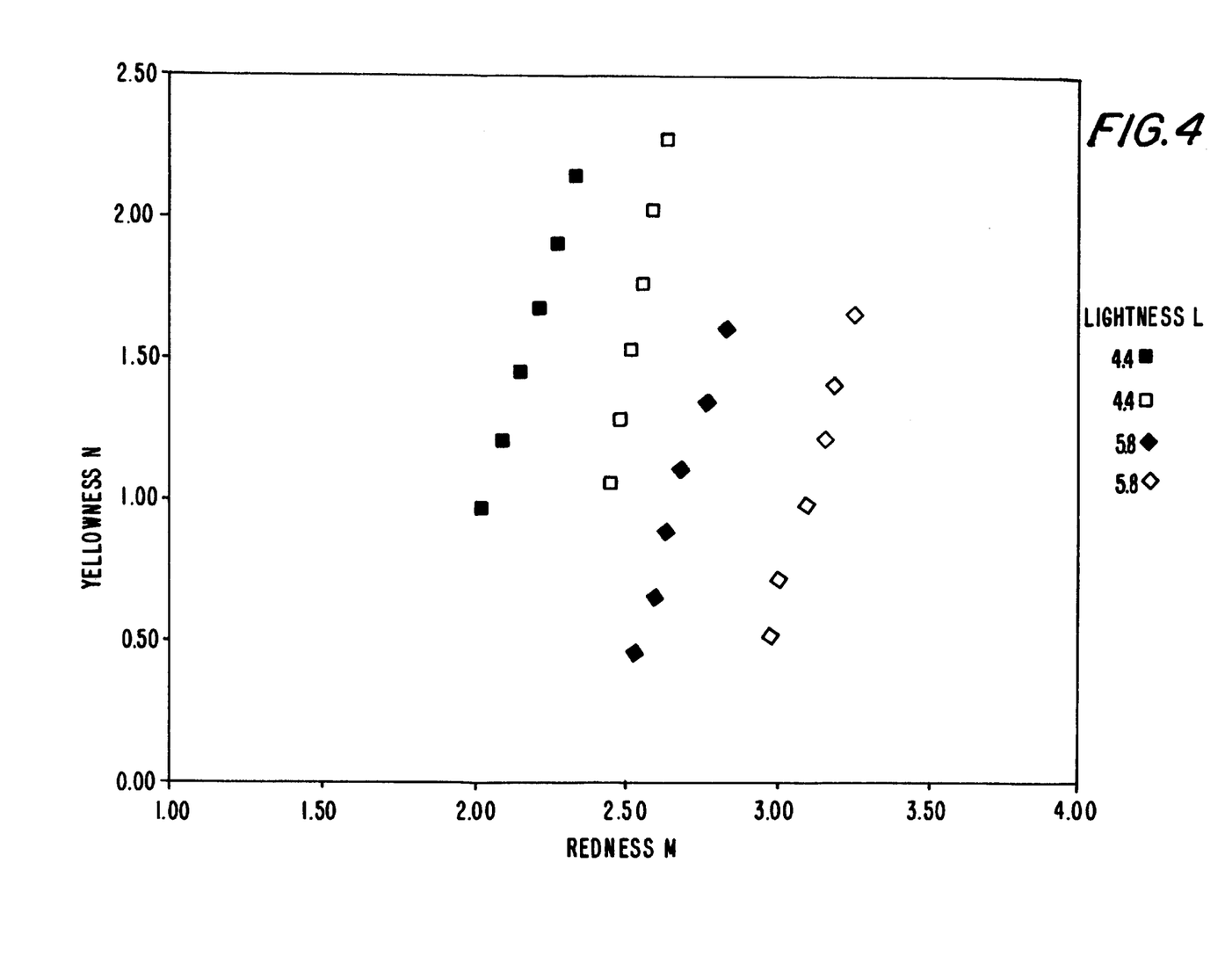
FIG. 4 is a graphical representation of the results of calculations performed to evaluate the color of the samples represented in FIGS. 2 and 3 with a Color Index in accordance with an illustrative embodiment of this invention.

FIG. 4 shows in graphical form the information presented in Table 2. Shown in FIG. 4 are attributes of redness (M) plotted along the x-axis and attributes of yellowness (N) plotted along the y-axis determined in accordance with the principles of this invention using equations 1 and 2. FIG. 4 illustrates that the Color Index in accordance with an illustrative embodiment of the principles of this invention renders attributes corresponding to redness (M) and yellowness (N) in even numerical intervals similar to the visual evaluation of the specimen which is located in colorimetrically evenly-stepped intervals.

In some applications it may be desirable to utilize a three-digit, single number index $CSCI_3$ (Color Measurement System and Color Index; three-digit) using the Color Measurement System and Color Index in accordance with the principles of this invention. If such a three digit number is desired, it may be calculated using the following equation:

$$CSCI_3=100*INT(L+0.5)+10*INT(M+0.5)+INT(N+0.5) \quad (4)$$

In the resulting three-digit single number index, the first digit is the correlate of lightness (L), the second digit the correlate of redness (M) and the last digit the correlate of yellowness (N). As in equation 3, the symbol INT in equation 4 stands for the integer value of the expression within parentheses.

Even though the data presented in FIG. 4 is represented only as a six digit index ($CSCI_6$), it will, however, be understood that the same data can be presented as a three digit index in accordance with equation 4 where the first digit would be a correlate of lightness (L), the second digit the correlate of redness (M) and the third digit the correlate of yellowness (N). It should, however, be noted that if the colors of the samples being evaluated are too close to each other, then the $CSCI_3$ index may not be a useful unit of measure for that series of color.

When formulating indices for categorizing skin, teeth, hair and material substances, it may also be beneficial to utilize still broader categories than those provided by the indices noted above. For example, in some instances it may be very useful to formulate indices from attributes of lightness (L) taken together with the yellowness-blueness (N) attribute, while in other instances it may be useful to formulate indices using the attributes of lightness (L) and redness-greenness (M).

In order to make a broader category formulation from attributes of lightness (L) taken together with the yellowness-blueness (N) attribute, an index may be formulated using the Color Measurement System and Color Index for Skin, Teeth, Hair and Material Substances in accordance with the principles of this invention.

One example of formulating a color index for a specific purpose utilizing the attributes of lightness (L) and yellowness-blueness (N) of the Color Index of this invention is the correlation of skin color with the presence of an abnormal medical condition. Several abnormal medical conditions can cause jaundice. The most notable abnormal medical condition that might be detected by such a color index directly is the serological bilirubin count of a hyperbilirubinemia newborn baby. In such an instance, statistically significant data relating skin color to serological bilirubin count may be fitted to the index. Thereafter, a color measurement of the affected skin evaluated using the Color Measurement System and Color Index for Skin, Teeth, Hair and Material Substances in accordance with the principles of this invention may directly read the serological bilirubin count in a non-invasive procedure.

Suitable color standards for skin color measurements for detecting conditions affecting hyperbilirubinemia may be chosen using skin color categories. Skin color categories are disclosed in Macfarlane et al. U.S. Pat. No. 5,671,735, Macfarlane et al. U.S. patent application Ser. No. 08/939,462, filed on Sep. 29, 1997, Macfarlane et al. U.S. patent application Ser. No. 08/939,588, filed on Sep. 29, 1997, Macfarlane et al. U.S. patent application Ser. No. 08/939,784, filed on Sep. 29, 1997, Macfarlane et al. U.S. patent application Ser. No. 08/939,232, filed Sep. 29, 1997, and PCT Publication No. WO 96/41140 (which are hereby incorporated by reference in their entirety herein).

Similarly, to make a broader category formulation from attributes of lightness (L) taken together with the redness-greenness (M) attribute, an index may be formulated using the Color Measurement System and Color Index for Skin, Teeth, Hair and Material Substances in accordance with the principles of this invention to yield the attributes L and M.

If desired, the red (R), yellow (Y), green (G) and blue (B) components or suitable combinations of all or some of these components may be converted into an indicator of the serological bilirubin count of a patient (i.e., the type of serological bilirubin count typically measured by a laboratory spectrophotometer). Infant jaundice may be diagnosed by measuring the red (R), yellow (Y), green (G) and blue (B) components with a suitable color measuring instrument and converting the measured components to the indicator of serological bilirubin count.

Figure 5:
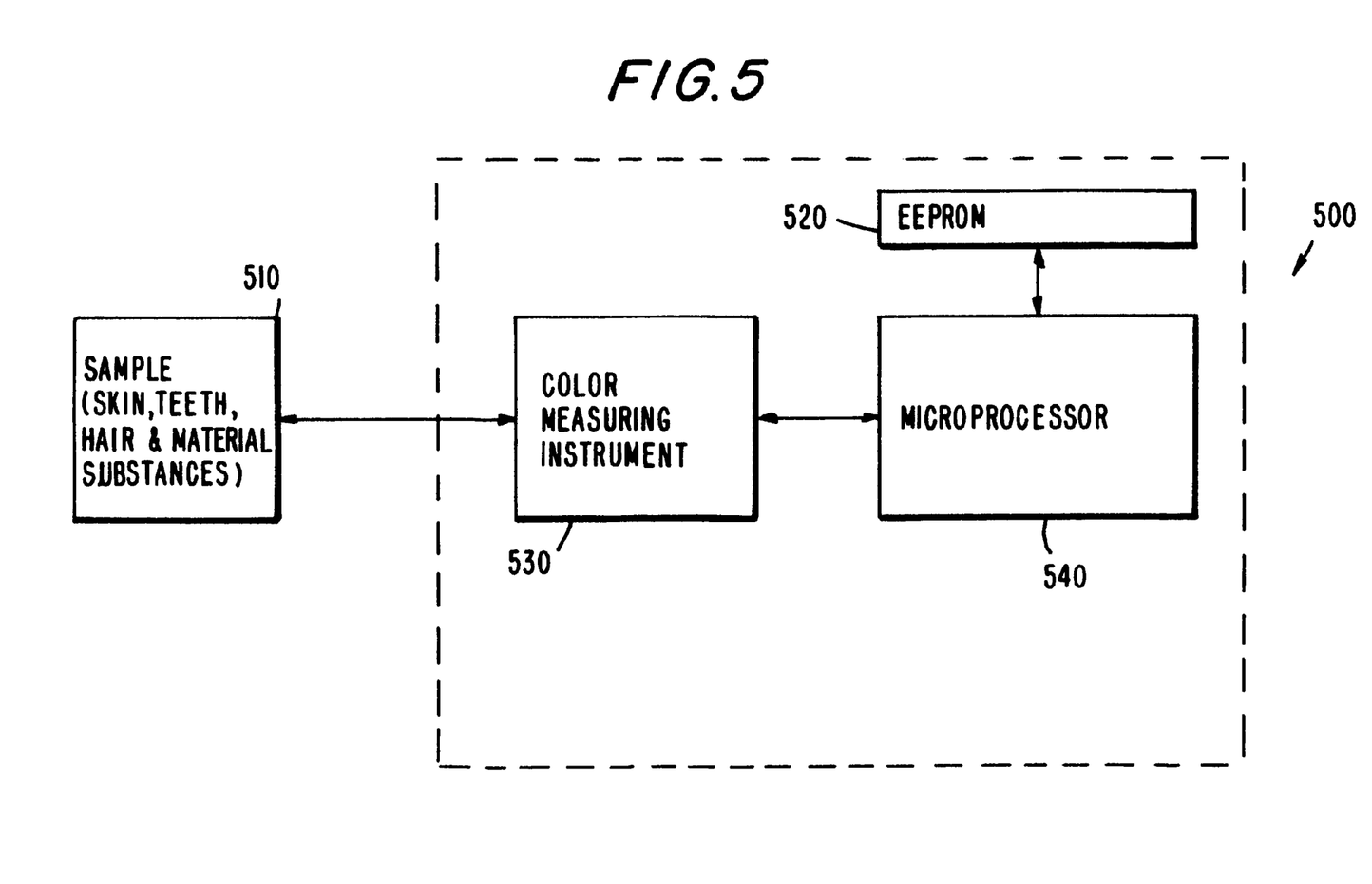
FIG. 5 is a simplified block diagram of an illustrative Color Measurement System for evaluating the color of skin, teeth, hair and material substances with a Color Index in accordance with the present invention.

FIG. 5 is a simplified block diagram of an illustrative Color Measurement System for evaluating the color of skin, teeth, hair and material substances with a Color Index in accordance with the present invention. Color Measurement System 500 for evaluating the color of skin, teeth, hair and material substances with a Color Index in accordance with the principles of this invention measures the reflectance spectra of sample 510 using color measuring instrument 530. Color measuring instrument 530 could be, for example, a spectrocolorimeter or spectrophotometer suitable for measuring the color of a sample surface such as skin, teeth, hair or material substances.

Memory device 520 provides data pertaining to the weighting factors corresponding to four color components, i.e., red, green, yellow and blue. As described earlier, these weighting factors place the appearance of the four color components in opponency to each other. Memory device 520 also provides data relating to individual contributions to color appearance to each of the four color components on the part of a perfect diffuser, i.e., a theoretical object having 100% reflectance. The data provided by memory device 520 is presented in tabular form in Table 1 as well as graphically illustrated in FIG. 2.

Microprocessor 540 uses the data provided by color measuring instrument 530 as well as data from memory device 520 and performs the necessary calculations (in accordance with equations 1 and 2) to determine the individual contributions to color appearance corresponding to each of the four color components, i.e., red, green, yellow and blue and uses the derived data to calculate the Color Index for sample 510.

Though for illustrative purposes memory device 520 and microprocessor 540 are shown as separate components of Color Measurement System 500, it will be understood that both memory device 520 and microprocessor 540 can be integrated with color measuring instrument 530.

The above construction of the indices describes the procedure for evaluating the indices starting with the reflectance spectrum of the specimen being assessed. However, that is not the only method by which the index may be evaluated.

In accordance with another illustrative embodiment of this invention, the indices may be equally well evaluated by causing the spectral response function of a color measuring instrument such as a spectrocolorimeter or a spectrophotometer or other color measuring instrument suitable for measuring the color of a sample surface such as skin, teeth, hair or material substances to fit the weighting functions of Table 1 (FIG. 5). With a minimum of further calculations, the spectrocolorimeter may then read the index, or its resultant category, directly.

In accordance with the above-described embodiment of this invention, the spectral response function of a color measuring instrument such as a spectrocolorimeter or a spectrophotometer or other color measuring instrument suitable for measuring the color of a sample surface such as skin, teeth, hair or material substances is conformed to fit the weighting factors shown in Table 1 and FIG. 1. The spectral response function of a color measuring instrument may be conformed to fit the weighting factors in accordance with this invention by, for example, using four or more filters cumulatively having the transmission spectrum of FIG. 1.

In accordance with the above-described embodiment of the invention, the spectral response function of the color measuring instrument is conformed to respond to light of various wavelengths in accordance with the weighting factor tabulated in Table 1 and graphically illustrated in FIG. 1. After conforming the spectral response function of a color measuring instrument to fit the weighting factors disclosed in this invention, the color measuring instrument may then read the Color Index, or its resultant category, directly with a minimum of further calculations.

Figure 6:
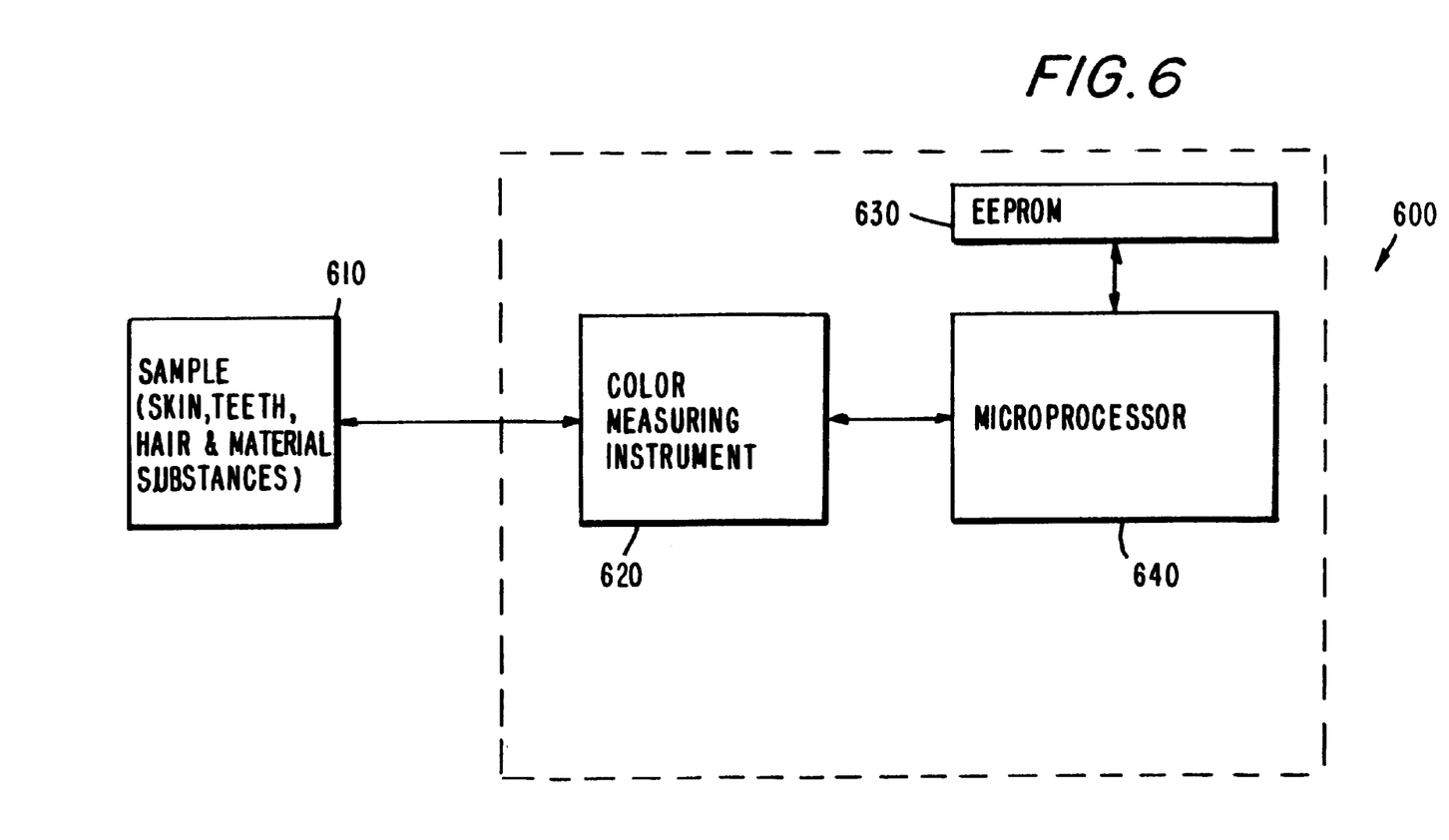
FIG. 6 is a simplified block diagram of an illustrative Color Measurement System for evaluating the color of skin, teeth, hair and material substances with a Color Index in accordance with another illustrative embodiment of the present invention.

FIG. 6 is a simplified block diagram of an illustrative Color Measurement System for evaluating the color of skin, teeth, hair and material substances with a Color Index in accordance with the above-described embodiment of the present invention. Color Measurement System 600 for evaluating the color of skin, teeth, hair and material substances with a Color Index in accordance with the principles of this invention measures the reflectance spectra of sample 610 using color measuring instrument 620. Color measuring instrument 620 could be, for example, a spectrocolorimeter or spectrophotometer suitable for measuring the color of a sample surface such as skin, teeth, hair or material substances.

Memory device 630 provides data pertaining to individual contributions to each of the four color components on the part of a perfect diffuser, i.e., a theoretical object having 100% reflectance. The data provided by memory device 630 is indexed as SUM in Table 1.

Microprocessor 640 uses the data provided by color measuring instrument 620 as well as data from memory device 630 and performs the necessary calculations (in accordance with equation 2) to calculate the Color Index for sample 610.

Though for illustrative purposes memory device 630 and microprocessor 640 are shown as separate components of Color Measurement System 600, it will be understood that both the memory device 630 and microprocessor 540 can be integrated with color measuring instrument 530.

While the Color Measurement System and Color Index for Skin, Teeth, Hair and Material Substances in accordance with the principles of this invention has been described for the categorization of human skin, teeth, hair and material substances, it will be understood that the principles of this invention are extensible to the entire range of producible surface colors by allowing the attributes redness-greenness (M) and yellowness-blueness (N) to acquire negative values. Grass greens, for example, will have negative M values and positive N values. Blue greens, such as cyan, will have negative M and N values. Purples will have positive M values and negative N values. It should, however, be noted that single number indices e.g., $CSCI_6$ and $CSCI_3$, are inapplicable when the index is extended to the entire color range because some parameters may acquire negative values.

Thus, it is apparent that there has been provided, in accordance with the invention, methods and systems for measuring with a Color Measurement System of predetermined specification and evaluating the color of skin, teeth, hair, and material substances with a Color Index that fully satisfy the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

The invention claimed is:

1. A method for evaluating color of a sample using a Color Measurement System with a Color Index, said method comprising:

measuring said sample's reflectance spectrum using a color measuring instrument;

weighting said reflectance spectrum with weighting factors corresponding to four color components that form two opponent pairs of color components wherein said weighting factors are used to calculate said sample's reflectance spectrum's contribution to said four color components' appearance; and determining individual contributions corresponding to each of said four color components and calculating said Color Index using said individual contributions and respective contributions to each of a respective one of said four color components by a perfect diffuser, said determining comprising:

summing said sample's reflectance spectrum's contribution to the appearance of each of a respective one of said four color components at a plurality of wavelengths into said individual contributions corresponding to each of said four color components that form said two opponent pairs of color components.

2. The method of claim 1 wherein said sample comprises skin, teeth, hair or material substances.

3. The method of claim 1 wherein said measuring is independent of illuminating conditions.

4. The method of claim 1 wherein red and green, and yellow and blue form said two opponent pairs of color components.

5. The method of claim 4 wherein red is placed in opponency to green, and yellow is placed in opponency to blue.

6. The method of claim 1 wherein said individual contributions are determined using:

$$R = \Sigma R(\lambda) * Rwt(\lambda) \Delta\lambda$$

$$Y = \Sigma R(\lambda) * Ywt(\lambda) \Delta\lambda$$

$$G = \Sigma R(\lambda) * Gwt(\lambda) \Delta\lambda$$

$$B = \Sigma R(\lambda) * Bwt(\lambda) \Delta\lambda$$

where $R(\lambda)$ is said sample's reflectance factor, $Rwt(\lambda)$, $Ywt(\lambda)$, $Gwt(\lambda)$ and $Bwt(\lambda)$ are weighting factors and $\lambda$ varies from 1 to k measurement intervals.

7. The method of claim 1 wherein said Color Index is calculated using:

$$L = 2.55\{33.333(R/Rn) + 17.333(Y/Yn) + 16.0(G/Gn) + 33.333(B/Bn) + 0.39\}^{1/3} - 1.863$$

$$M = \{88(R/Rn) - 46(Y/Yn) - 42(G/Gn)\}/L$$

$$N = \{75(R/Rn) + 40(Y/Yn) + 35(G/Gn) - 150(B/Bn)\}/L$$

where L is a correlate of lightness-darkness, M is a correlate of redness-greenness, N is a correlate of yellowness-blueness, R, Y, G and B are said individual contributions corresponding to each of said four color components and Rn, Yn, Gn and Bn are contributions to each color component by a perfect reflecting diffuser.

8. The method of claim 7 wherein said correlate of lightness-darkness L, said correlate of redness-greenness M and said correlate of yellowness-blueness N are used to generate a six-digit single number index ($CSCI_6$) indicative of said sample's color.

9. The method of claim 8 wherein said six-digit single number index ($CSCI_6$) is determined using:

$$CSCI_6=10000*INT(10*(L+0.05))+100*INT(10*(M+0.05))+INT(10*(N+0.05))$$

where L is a correlate of lightness-darkness, M is a correlate of redness-greenness, N is a correlate of yellowness-blueness and INT stands for an integer value of corresponding expression within parentheses.

10. The method of claim 7 wherein said correlate of lightness-darkness L, said correlate of redness-greenness M and said correlate of yellowness-blueness N are used to generate a three-digit single number index ($CSCI_3$) indicative of said sample's color.

11. The method of claim 10 wherein said three-digit single number index ($CSCI_3$) is determined using:

$$CSCI_3=100*INT(L+0.5)+10*INT(M+0.5)+INT(N+0.5)$$

where L is a correlate of lightness-darkness, M is a correlate of redness-greenness, N is a correlate of yellowness-blueness and INT stands for an integer value of corresponding expression within parentheses.

12. A Color Measurement System for evaluating color of a sample with a Color Index comprising:
   means for measuring said sample's reflectance spectrum;
   means for weighting said reflectance spectrum with weighting factors corresponding to four color components that form two opponent pairs of color components wherein said weighting factors are used to calculate said sample's reflectance spectrum's contribution to said four color components' appearance;
   means for determining individual contributions corresponding to each of said four color components and calculating said Color Index using said individual contributions and respective contributions to each of a respective one of said color components by a perfect diffuser, said determining comprising:
      summing said sample's reflectance spectrum's contribution to the appearance of each of a respective one of said four color components at a plurality of wavelengths into said individual contributions corresponding to each of said four color components that form said two opponent pairs of color components.

13. The Color Measurement System of claim 12 wherein said sample comprises skin, teeth, hair or material substances.

14. The Color Measurement System of claim 12 wherein said means for storing said weighting factors comprises an EEPROM.

15. The Color Measurement System of claim 12 wherein said means for measuring said sample's reflectance spectrum comprises a color measuring instrument.

16. The Color Measurement System of claim 12 wherein said means for calculating said Color Index comprises a microprocessor.

17. A method for evaluating color of a sample using a Color Measurement System with a Color Index, said method comprising:
   adjusting a color measuring instrument's spectral response function to fit weighting factors corresponding to four color components that form two opponent pairs of color components wherein said weighting factors are used to calculate said sample's reflectance spectrum's contribution to said four color components' appearance;
   measuring said sample's reflectance spectrum using said color measuring instrument wherein said sample's reflectance spectrum from said measuring is representative of a summing of said sample's reflectance spectrum's contribution to the appearance of each of a respective one of said four color components at a plurality of wavelengths into individual contributions corresponding to each of a respective one of said four color components that form two opponent pairs of color components; and
   calculating said Color Index using said individual contributions corresponding to each of a respective one of said four color components and respective contributions to each of a respective one of said four color components by a perfect diffuser.

18. The method of claim 17 wherein said sample comprises skin, teeth, hair or material substances.

19. The method of claim 17 wherein said measuring is independent of illuminating conditions.

20. The method of claim 17 wherein red and green, and yellow and blue form said two opponent pairs of color components.

21. The method of claim 20 wherein red is placed in opponency to green and yellow is placed in opponency to blue.

22. The method of claim 17 wherein said sample's reflectance spectrum from said measuring is representative of individual contributions corresponding to each of said four color components placed in opponency to each other by said weighting factors and is characterized by:

$$R=\Sigma R(\lambda)*Rwt(\lambda)\Delta\lambda$$

$$Y=\Sigma R(\lambda)*Ywt(\lambda)\Delta\lambda$$

$$G=\Sigma R(\lambda)*Gwt(\lambda)\Delta\lambda$$

$$B=\Sigma R(\lambda)*Bwt(\lambda)\Delta\lambda$$

where $R(\lambda)$ is the sample's reflectance factor, $Rwt(\lambda)$, $Ywt(\lambda)$, $Gwt(\lambda)$ and $Bwt(\lambda)$ are weighting factors and $\lambda$ varies from 1 to k measurement intervals.

23. The method of claim 17 wherein said Color Index is calculated using:

$$L=2.55\{33.333(R/Rn)+17.333(Y/Yn)+16.0(G/Gn)+33.333(B/Bn)+0.39\}^{1/3}-1.863$$

$$M=\{88(R/Rn)-46(Y/Yn)-42(G/Gn)\}/L$$

$$N=\{75(R/Rn)+40(Y/Yn)+35(G/Gn)-150(B/Bn)\}/L$$

where L is a correlate of lightness-darkness, M is a correlate of redness-greenness, N is a correlate of yellowness-blueness, R, Y, G and B are said individual contributions corresponding to each of said four color components and Rn, Yn, Gn and Bn are contributions to each color component by a perfect reflecting diffuser.

24. The method of claim 23 wherein said correlate of lightness-darkness L, said correlate of redness-greenness M and said correlate of yellowness-blueness N are used to generate a six-digit single number index ($CSCI_6$) indicative of said sample's color.

25. The method of claim 24 wherein said six-digit single number index ($CSCI_6$) is determined using:

$$CSCI_6=10000*INT(10*(L+0.05))+100*INT(10*(M+0.05))+INT(10*(N+0.05))$$

where L is a correlate of lightness-darkness, M is a correlate of redness-greenness, N is a correlate of yellowness-blueness and INT stands for an integer value of corresponding expression within parentheses.

26. The method of claim 23 wherein said correlate of lightness-darkness L, said correlate of redness-greenness M and said correlate of yellowness-blueness N are used to generate a three-digit single number index ($CSCI_3$) indicative of said sample's color.

27. The method of claim 26 wherein said three-digit single number index ($CSCI_3$) is determined using:

$$CSCI_3 = 100*INT(L+0.5) + 10*INT(M+0.5) + INT(N+0.5)$$

where L is a correlate of lightness-darkness, M is a correlate of redness-greenness, N is a correlate of yellowness-blueness and INT stands for an integer value of corresponding expression within parentheses.

28. A Color Measurement System for evaluating color of a sample with a Color Index comprising:

a color measuring instrument having an associated spectral response function for measuring said sample's reflectance spectrum, said spectral response function adjusted to fit weighting factors corresponding to four color components that form two opponent pairs of color components wherein said weighting factors are used to calculate said sample's reflectance spectrum's contribution to said four color components' appearance, said sample's reflectance spectrum from said measuring being representative of individual contributions corresponding to each of said four color components that form said two opponent pairs of color components; and means for calculating said Color Index using said individual contributions corresponding to each of said four color components that form said two opponent pairs of color components and respective contributions to each of a respective one of said four color components by a perfect diffuser.

29. The Color Measurement System of claim 28 wherein said sample comprises skin, teeth, hair or material substances.

30. The Color Measurement System of claim 28 wherein said respective contributions to each of a respective one of said four color components by a perfect diffuser are stored in an EEPROM.

31. The Color Measurement System of claim 28 wherein said means for calculating said Color Index comprises a microprocessor.

32. An apparatus for evaluating color of a sample with a Color Index comprising:

a color measuring instrument for measuring said sample's reflectance spectrum;

means for storing weighting factors for weighting of said reflectance spectrum, said weighting factors corresponding to four color components that form two opponent pairs of color components wherein said weighting factors are used to calculate said sample's reflectance spectrum's contribution to said four color components' appearance;

means for determining individual contributions corresponding to each of said four color components and calculating said Color Index using said individual contributions and respective contributions to each of a respective one of said color components by a perfect diffuser, said determining comprising:

summing said sample's reflectance spectrum's contribution to the appearance of each of a respective one of said four color components at a plurality of wavelengths into said individual contributions corresponding to each of said four color components that form said two opponent pairs of color components.

33. The apparatus of claim 32 wherein said sample comprises skin, teeth, hair and material substances.

34. The apparatus of claim 32 wherein said means for storing said weighting factors comprises an EEPROM.

35. The apparatus of claim 32 wherein said means for calculating said Color Index comprises a microprocessor.

36. An apparatus for evaluating color of a sample with a Color Index comprising:

a color measuring instrument having an associated spectral response function for measuring said sample's reflectance spectrum, said spectral response function adjusted to fit weighting factors corresponding to four color components that form two opponent pairs of color components wherein said weighting factors are used to calculate said sample's reflectance spectrum's contribution to said four color components' appearance, said sample's reflectance spectrum from said measuring being representative of individual contributions corresponding to each of said four color components that form said two opponent pairs of color components; and a microprocessor for calculating said Color Index using said individual contributions corresponding to each of said four color components that form said two opponent pairs of color components and respective contributions to each of a respective one of said four color components by a perfect diffuser.

37. The apparatus of claim 36 wherein said sample comprises skin, teeth, hair or material substances.

38. The apparatus of claim 36 wherein said respective contributions to each of a respective one of said four color components by a perfect diffuser are stored in an EEPROM.

* * * * *